United States Patent [19]

Fujimura et al.

[11] 3,737,991

[45] June 12, 1973

[54] METHOD OF MAKING A MULTI-CHANNEL MAGNETIC HEAD

[75] Inventors: Kenichi Fujimura, Neyagawa-shi; Takashi Tanaka, Osaka, both of Japan

[73] Assignee: Matsushita Electric Industrial Co. Ltd., Kadoma, Osaka, Japan

[22] Filed: Aug. 11, 1971

[21] Appl. No.: 170,875

[30] Foreign Application Priority Data

| | | |
|---|---|---|
| Aug. 18, 1970 | Japan | 45/72589 |
| Nov. 13, 1970 | Japan | 45/100572 |
| Nov. 16, 1970 | Japan | 45/101745 |
| Nov. 16, 1970 | Japan | 45/101747 |
| Nov. 7, 1970 | Japan | 45/98580 |
| Mar. 24, 1971 | Japan | 46/17420 |
| Nov. 12, 1970 | Japan | 45/9913 |

[52] U.S. Cl. .............................. 29/603, 179/100.2 C

[51] Int. Cl. .............................. G11b 5/42, H01f 7/06

[58] Field of Search ............... 29/603; 179/100.2 C; 340/174.1 F; 346/74 MC

[56] References Cited

UNITED STATES PATENTS

| | | | |
|---|---|---|---|
| 3,402,463 | 9/1968 | Bos et al. | 29/603 |
| 3,353,261 | 11/1967 | Bradford et al | 29/603 |
| 3,518,646 | 6/1970 | Sakasegawa | 340/174.1 F |
| 2,835,743 | 5/1958 | Muffley | 340/174.1 F |
| 2,532,100 | 11/1950 | Howell | 179/100.2 C |
| 2,479,308 | 8/1949 | Camras | 179/100.2 C |
| 3,562,442 | 2/1971 | Pear, Jr. | 179/100.2 C |

*Primary Examiner*—Charles W. Lanham
*Assistant Examiner*—Carl E. Hall
*Attorney*—E. F. Wenderoth, John E. Lind and V. M. Creedon

[57] ABSTRACT

A method of making a multi-channel magnetic head. Two blocks of magnetic material are provided, each of which has one surface smoothly polished and has one groove in the polished surface. The blocks are joined to each other with the grooved surfaces opposed to each other and a gap material between them and so that the grooves face each other. A conductive rod is inserted into the bore formed by the grooves. Slots perpendicular to and extending across the grooves are cut in the joined blocks and through the rod. Two conductive plates are inserted into each of the slots so that they are in separate electrical contact with the remaining portions of the conductive rod. The slots are filled with adhesive material. The resultant composite body is cut at a plane between the bore defined by the grooves and the bottom of the slots to form a stack of a plurality of single-turn elementary heads separated from each other by the adhesive material.

11 Claims, 11 Drawing Figures

PATENTED JUN 12 1973

3,737,991

SHEET 1 OF 2

*INVENTORS*
KENICHI FUJIMURA
TAKASHI TANAKA

BY *Wenderoth, Lind & Ponack*
ATTORNEYS

INVENTORS
KENICHI FUJIMURA
TAKASHI TANAKA

BY Wenderoth, Lind & Ponack
ATTORNEYS

METHOD OF MAKING A MULTI-CHANNEL MAGNETIC HEAD

This invention relates to a method of making a multi-channel magnetic head, especially a heat composed of a stack of a plurality of single-turn elementary heads.

A conventional multi-channel magnetic head with cores of magnetic metal such as easily magnetized 80 Ni - 20 Fe alloy known as Permalloy, is prepared in the following way. C-shaped core members or C-shaped and I-shaped core members having windings with a plurality of turns thereon are alternately stacked with a suitable space between adjacent core members in order to form a half of a multi-channel magnetic head. Then the two halves are joined together by using a spacer therebetween. Each of the core members in one half matches up with a corresponding core member in the other half to form an elementary head of a ring type.

A conventional multi-channel magnetic head with cores of magnetic oxides such as ferrites is prepared in the following way. Head tips are assembled into one stack in a way such that each of the head tips has a thin layer of glass sandwiched between two magnetic parts. Two adjacent head tips are magnetically separated by a non-magnetic material. A plurality of magnetic head tips are joined with a plurality of magnetic back cores, each having a winding of a plurality of turns.

In these constructions, it is difficult to reduce the distance between two elementary heads because the windings occupy a large space. Moreover, windings with a plurality of turns make cores large and cause high cross-talk.

In addition, in a head with magnetic oxide cores, air gaps between the head tips and the back cores reduce the output voltage and increase cross-talk. In a multi-channel magnetic head, elementary heads have output voltages different from each other because they have air gap lengths different from each other. The different output voltages have a serious effect especially on a multi-channel magnetic head with a narrow track width, because the small area between a back core and the corresponding head tip makes it difficult to reduce or to eliminate any difference in the output voltages.

An object of the present invention is to provide a method of making a multi-channel magnetic head which causes very little cross-talk between adjacent channels and has a high track density.

Another object of the present invention is to provide a method of making a multi-channel magnetic head in which the outputs of all the elementary heads are nearly equal.

These objects are achieved by a method of making a multi-channel magnetic head according to the present invention which comprises the following steps:

1. providing two blocks of magnetic material, each of which has one surface smoothly polished and has one groove in said polished surface;
2. joining said two magnetic blocks to each other with the grooved surfaces opposed to each other and a non-magnetic gap forming material between them, and so that said grooves face each other,
3. inserting a conductive rod into the bore defined by said grooves;
4. cutting slots in the joined blocks which are perpendicular to and extend across said grooves and through said rod;
5. inserting into each of said slots two conductive plates so that they are in separate electrical contact with the end of the remaining portions of said conductive rod;
6. filling said slots with adhesive material;
7. cutting the resultant composite body at a plane between the bore defined by said grooves and the bottoms of said slots.

These and other features of the invention will be apparent from the following detailed description taken together with the accompanying drawings, in which.

Figure 1:
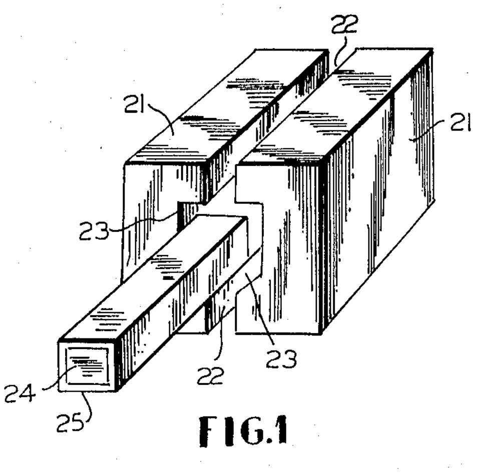
FIGS. 1 and 2 are perspective views showing steps in a method of making a multi-channel magnetic head according to the present invention.

Referring to FIG. 1, reference character 21 designates blocks of magnetic material. Each of said blocks 21 has one surface 22 smoothly polished and has one groove 23 in said polished surface 22. Two of said blocks 21 are joined to each other with the grooved surfaces 22 opposed to each other with a gap 27 (shown in FIG. 2) between them and so that said grooves 23 face each other. Said gap 27 is filled with non-magnetic material which bonds the blocks to each other. When the blocks 21 are made of magnetic oxide such as MnZn-ferrite or NiZn-ferrite the gap is filled with glass. When the blocks 21 are made of magnetic metal such as a highly magnetizable Ni-Fe alloy, such as Permalloy, the blocks are joined to each other by a thin film of non-magnetic material.

A conductive rod 24 is inserted into the bore defined by said grooves 23. When the blocks 21 are made of magnetic metal, a thin layer of non-conductive material 25 such as plastic is formed on the surface of the rod 24 before insertion of the rod, to prevent the rod 25 from electrically contacting the block 21.

Figure 2:
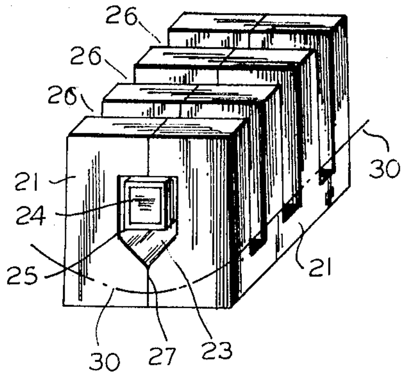

Then, slots 26 are cut as shown in FIG. 2. Slots 26 are perpendicular to and extend across said grooves 23 and the bore defined thereby. Cutting of the slots also cuts the rod 24 into sections which remain within the uncut portions of blocks 21. Each of said slots 26 is separated from adjacent slots by a distance corresponding to the track width on the tape. Said slots 26 each have the width corresponding to a space between adjacent tracks on a tape.

Figure 3:
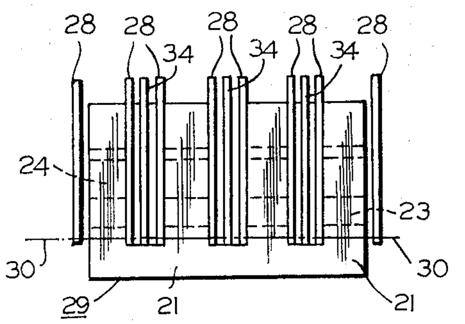
FIG. 3 is a side view showing further steps in the method of making a multi-channel magnetic head according to the present invention as shown in FIGS. 1 and 2.

Two conductive plates 28 are inserted into each of said slots 26 so that they are in separate electrical contact with the portions of said conductive rod 24 remaining within the bore in the uncut portions of the block, as shown in FIG. 3. Each portion of said conductive rod 24 has one conductive plate 28 in electrical contact with each end thereof. Each portion of the conductive rod 24 and two conductive plates 28 in electrical contact with the two ends thereof form a single-turn winding.

When the blocks 21 are made of magnetic metal, the plates 28 are insulated from the blocks 21, by forming a thin layer of insulating material on, for example, the remaining portions of the blocks 21.

If necessary, a shield plate 34 is inserted between the two conductive plates 28 in each of the slots 26.

Then, the slots 26 are filled with adhesive material so as to form a composite body 29. When the blocks are made of ferrite, the adhesive material used is glass, which melts at a high temperature. In this case said conductive rod 24 and said conductive plates 28 are made of precious metals such as gold or platinum which are stable at high temperature and have high electrical conductivity.

The composite body 29 is then cut at a plane between the bore defined by said grooves 23 and the bottoms of said slots 26 as shown by a curved surface 30 in FIGS. 2 and 3. Accordingly, a stack of a plurality of single-turn elementary heads separated from each other by said adhesive material is formed.

Each of the elementary heads has a very small impedance and output, and requires very high recording current. So, usually a transformer is connected between each of the elementary heads and an amplifier for matching the impedance and for transformations of voltage and current.

In this construction, each elementary head has a smaller size than the conventional heads. Therefore, there is less cross-talk between adjacent channels.

By using the above-described method a multi-channel magnetic head can be made which has very small distances between adjacent elementary heads. Moreover, in the multi-channel magnetic head made by above method, each elementary head has a high output compared with conventional heads and has an output nearly equal to the outputs of other elementary heads, because the respective elementary head cores do not have joints between the head tip and the back core. The head construction in which there are no such joints reduces the cross-talk between adjacent elementary heads.

In this construction, because the conductive rod 24 and the conductive plates 28 occupy almost all the space in the bore defined by the grooves 23 and in the slots 26, the single-turn windings have very low resistance. When a step-up transformer is used to step up the head voltage in the reproducing process, the lower limit of the frequency range is a frequency at which the inductive impedance of the primary winding of the transformer is nearly equal to the total resistance of the head and the transformer windings. The lower limit of the multi-channel magnetic head made by the above-described method is low because the winding resistance is low.

When the core is made of ferrite which has high resistivity, insulation between the conductive rod or plates and the core is not necessary.

The use of the shield plate 34 made of ferrite not only reduces cross-talk between adjacent elementary heads, but also insulates the two conductive plates 28 from each other in each slot 26.

Figure 4:
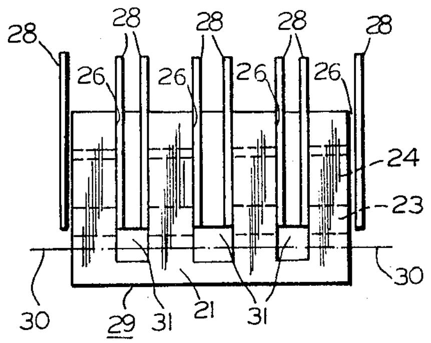
FIG. 4 is a side view showing a step in another method of making a multi-channel magnetic head.

Another embodiment is shown in FIG. 4, where said slots 26 are filled at the bottom below said conductive rod 24 with high wear resistance material 31 such as glass in advance of the insertion of said two conductive plates 28.

In the embodiment shown in FIG. 3, precious metal is used for the conductive rod 24 and the conductive plates 28 in order to make it possible to fill the slots with glass. But in the embodiment shown in FIG. 4, any conductive material can be used for the conductive plates 28, because the conductive plates 28 are inserted into the slots 26 after the step of placing the glass in the slots.

Sometimes it is difficult to fill the slots 26 only at the bottom. A preferred method according to the invention is to fill the slots 26 almost entirely with high wear resistance material and then remove the material from the filled slots except for the bottom portions below said conductive rod 24 to form slots with a width similar to that of original slots 26.

The filled slots can be re-cut to remove the material except for the bottom portions below said conductive rod 24 to form slots for having a width larger than that of the original slots 26. Then said conductive plates 28 can be thicker and have a lower resistance.

Figure 5:
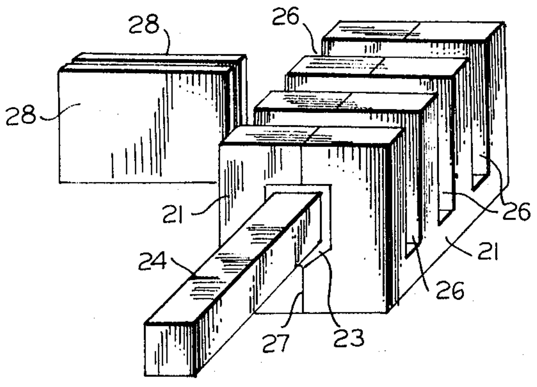
FIGS. 5 and 6 are a perspective and a cross-sectional view, respectively, showing steps in a further method of making a multi-channel magnetic head.
Figure 6:
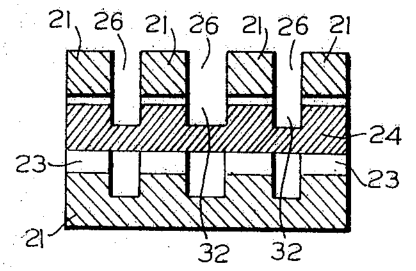

FIGS. 5 and 6 show another embodiment. Two magnetic blocks 21, each of which has one surface smoothly polished and has one groove 23 in said polished surface, are joined to each other in the same manner as in the embodiment described in connection with FIGS. 1–4. The two joined magnetic blocks 21 are cut to form slots 26 which are perpendicular to and extend beyond said grooves 23 and which are separated from each other by a distance corresponding to the track width on the tape. Each of said slots 26 has a width corresponding to the space between adjacent tracks on a tape. A conductive rod 24 is then inserted into the bore defined by said grooves 23. The rod 24 then has grooves 32 cut into it, as shown in FIG. 6. Two conductive plates 28 are inserted into each of said slots 26 and are positioned in electrical contact with the side faces of the grooves in said conductive rod 24.

In this method, the connection of said plates 28 and said rod 24 is easy, because said plates 28 are pressed downwards against said rod 24. The conductive plates 28 are more completely connected with the conductive rod 24 with grooves 32 therein.

In this method, the bottom portions of said slots 26 can be filled with high wear resistance material such as glass before insertion of said conductive rod 24 and said conductive plates 28. Therefore, said conductive rod 24 and said conductive plates 28 can be made of any conductive materials.

Figure 7:
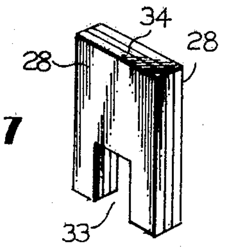
FIGS. 7 and 8 are perspective views of conductive plates which are used for a multi-channel magnetic head according to the present invention.
Figure 8:
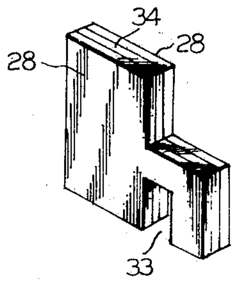
Figure 9:
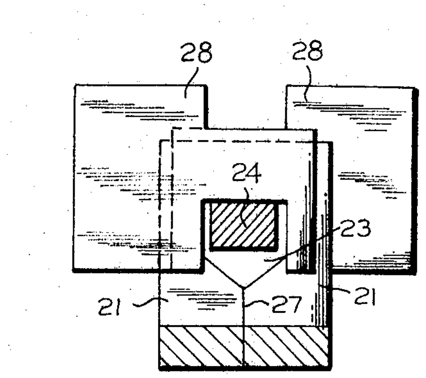
FIG. 9 is a cross-sectional view of a multi-channel magnetic head in which the conductive plates shown in FIG. 8 are used.

FIG. 7 and FIG. 8 show other forms of the conductive plates 28, which have the recesses 33 in the lower side so that they sit astride said conductive rod 24. Said recesses 33 fix the position of said plates 28 and make it easy to build up the multi-channel magnetic head. A shield plate 34 also has a recess 33 at the lower side. The conductive plates 28 shown in FIG. 8 are useful for staggered arrangement of transformers, such as shown in FIG. 9 in which the larger part of one plate extends to one side of the block 21 and the larger part of the next plate extends to the other side.

Figure 10:
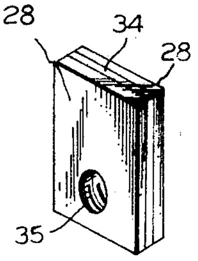
FIG. 10 is a perspective view of another conductive plate which is used for a multi-channel magnetic head.
Figure 11:
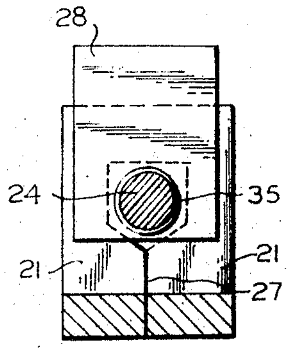
FIG. 11 is a cross-sectional view of a multi-channel magnetic head in which the conductive plates shown in FIG. 10 are used.

FIG. 10 shows another type of conductive plate 28, which has a hole 35. In using this type of plate, the conductive rod 24 is inserted into the bore defined by said grooves 23 of the magnetic blocks 21 and into said holes 35 after the plates are inserted into the grooves. Said plates 28 are secured firmly to said conductive rod 24 so that said plates 28 and said rod 24 are connected completely.

Said conductive rod 24 and said conductive plates 28 can be connected more easily and more completely by using the following methods.

The first method is to separate said two conductive plates 28 in each of said slots by an insulating sheet such as mica, and then the slots 26 are filled with electrically conductive adhesive material, such as solder or silver paint. When said plate 34 sandwiched between said two conductive plates 28 is made of magnetic material with high resistivity such as ferrite, it acts as the insulating sheet.

The second method is that said conductive rod 24 and/or said conductive plates 28 are made of solder and are connected together by heating.

The third method is that said conductive rod 24 and/or said conductive plates 28 are covered with a solder layer and are heated to form a solder connection.

What is claimed is:

1. A method of making a multi-channel magnetic head comprising, the steps of;
 1. providing two blocks of magnetic material, each of which has one surface smoothly polished and has one groove in said polished surface;
 2. joining said two magnetic blocks to each other with the grooved surfaces opposed to each other and with a gap therebetween and said grooves facing each other, and filling said gap with non-magnetic material which bonds the blocks to each other;
 3. inserting a conductive rod into the bore defined by said grooves;
 4. cutting slots in said blocks which are perpendicular to and which extend beyond said grooves and which divide said rod into a plurality of portions which remain within the portions of the bore in said blocks, and which slots are separated from each other a distance corresponding to the track width on a tape, each of said slots having a width corresponding to the space between adjacent tracks on a tape;
 5. inserting two conductive plates into each of said slots and into electrical contact with the ends of the portions of said conductive rod exposed in the slots so as to form single-turn windings;
 6. filling said slots with adhesive material;
 7. cutting the resultant composite body at a plane between the bore defined by said grooves and the bottoms of said slots to form a stack of a plurality of single-turn elementary heads separated from each other by said adhesive material.

2. A method of making a multi-channel magnetic head as claimed in claim 1, herein the bottoms of said cut slots below the level of said rod are filled with high wear resistance material before the insertion of said two conductive plates.

3. A method of making a multi-channel magnetic head as claimed in claim 1, wherein, prior to the insertion of said plates, said slots are filled with high wear-resistance material and the filled slots are again cut only to a depth adjacent the bottom of said conductive rod and with a width similar to that of the original slots to leave the bottoms of the slots filled with a high wear-resistance material.

4. A method of making a multi-channel magnetic head as claimed in claim 1, wherein, prior to the insertion of said plates, the slots are filled with a high wear-resistance material and the filled slots are again cut only to a depth adjacent the bottom of said conductive rod and with a width larger than that of the original slots to leave the bottoms of the slots filled with a high wear-resistance material.

5. A method of making a multi-channel magnetic head comprising, the steps of;
 1. providing two blocks of magnetic material, each of which has one surface smoothly polished and has one groove in said polished surface;
 2. joining said two magnetic blocks to each other with the grooved surfaces opposed to each other and with a gap therebetween and said grooves facing each other, and filling said gap with non-magnetic material which bonds the blocks to each other;
 3. cutting slots in said blocks which are perpendicular to and which extend beyond said grooves, and which are separated from each other a distance corresponding to the track width on a tape, each of said slots having a width corresponding to the space between adjacent tracks on a tape;
 4. inserting a conductive rod into the bore defined by said grooves;
 5. inserting two conductive plates into each of said slots and into electrical contact with said conductive rod exposed in the slots so as to form single-turn windings;
 6. filling said slots with adhesive material;
 7. cutting the resultant composite body at a plane between the bore defined by said grooves and the bottoms of said slots to form a stack of a plurality of single!-turn elementary heads separated from each other by said adhesive material.

6. A method of making a multi-channel magnetic head as claimed in claim 5, wherein said conductive plates have recesses in the lower side fitting over said conductive rod.

7. A method of making a multi-channel magnetic head as claimed in claim 1 further comprising sandwiching a magnetic plate between said two conductive plates.

8. A method of making a multi-channel magnetic head as claimed in claim 1, wherein a sheet of insulating material is positioned between said two conductive plates and said adhesive material is electrically conductive.

9. A method of making a multi-channel magnetic head as claimed in claim 1, wherein at least one of said conductive rod and said conductive plates is made of solder and said plates and rod are heated for forming a solder connection therebetween.

10. A method of making a multi-channel magnetic head as claimed in claim 1, wherein one of said conductive plates and said conductive rod are covered with solder layer and said plates and rod are heated for forming a solder connection.

11. A method of making a multi-channel magnetic head comprising, the steps of;

1. providing two blocks of magnetic material, each of which has one surface smoothly polished and has one groove in said polished surface;
2. joining said two magnetic blocks to each other with the grooved surfaces opposed to each other and with a gap therebetween and said grooves facing each other, and filling said gap with non-magnetic material which bonds said blocks to each other;
3. cutting slots in said blocks which are perpendicular to and which extend beyond said grooves, and which are separated from each other a distance corresponding to the track width on a tape, each of said slots having a width corresponding to the space between adjacent tracks on a tape;
4. inserting two conductive plates each of which has a hole therein into each of said slots;
5. inserting a conductive rod into the bore defined by said grooves and through the holes in the plates so as to form single turn windings;
6. filling said slots with adhesive material;
7. cutting the resultant composite body at a plane between the bore defined by said grooves and the bottoms of said slots to form a stack of a plurality of single-turn elementary heads separated from each other by said adhesive material.

* * * * *